United States Patent Office 3,339,640
Patented Sept. 5, 1967

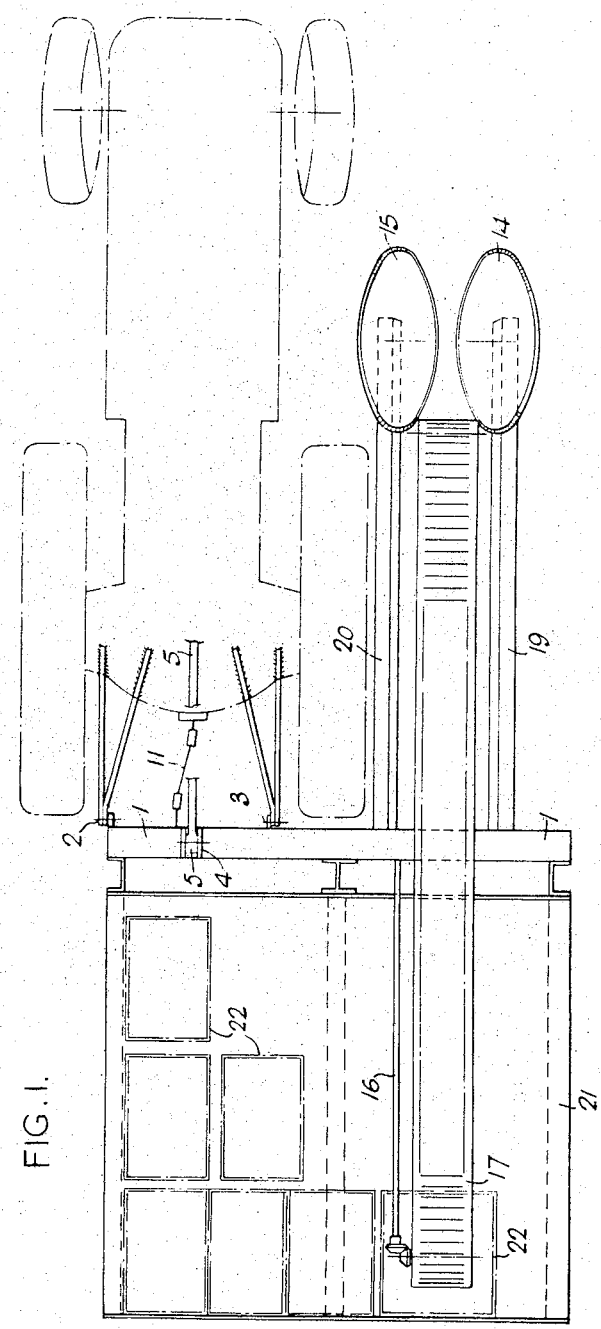

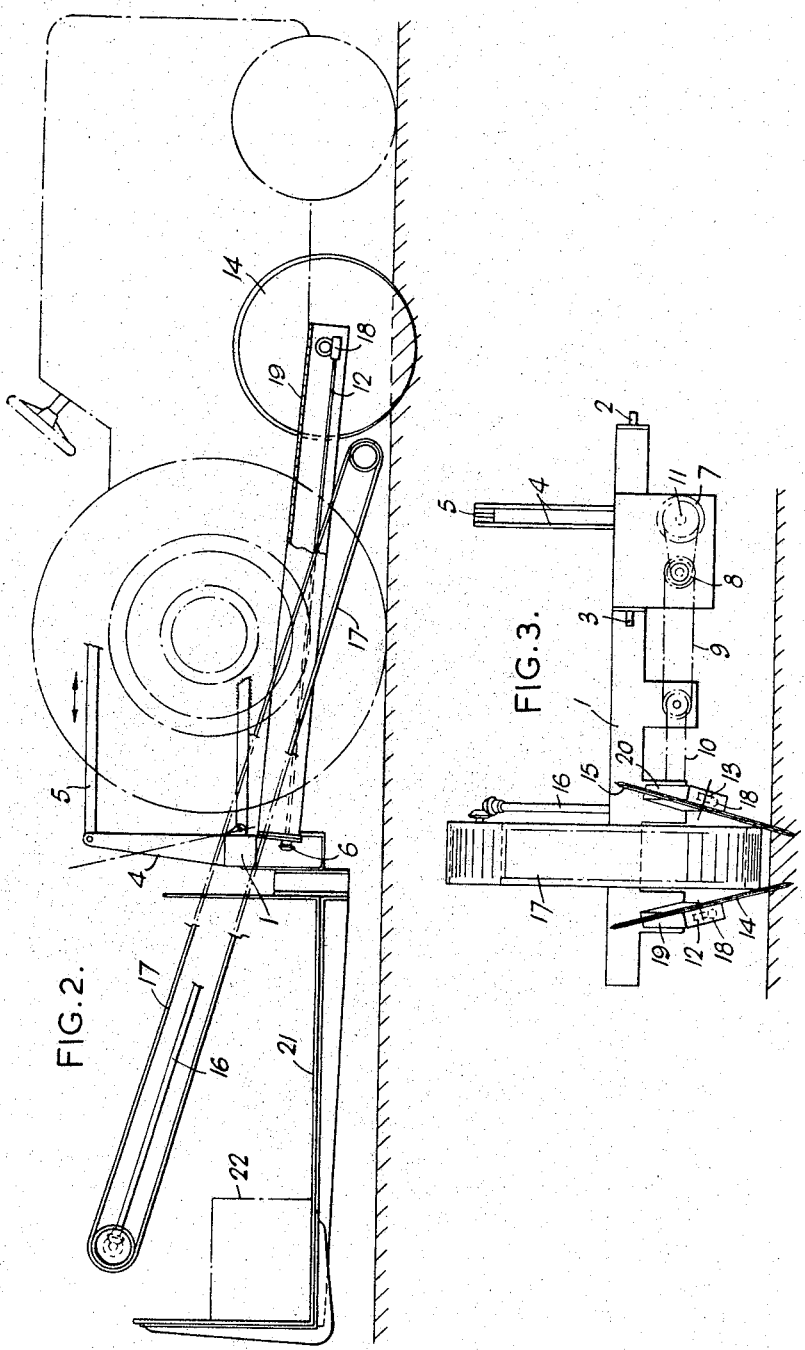

3,339,640
AGRICULTURAL AND LIKE MACHINES
John Clement Hawkins, Clophill, and Philip Whyte, Bedford, England, assignors to National Research Development Corporation, London, England, a British corporation
Continuation of application Ser. No. 337,892, Jan. 15, 1964. This application June 2, 1966, Ser. No. 554,899
Claims priority, application Great Britain, Jan. 23, 1963, 2,932/63
3 Claims. (Cl. 171—58)

ABSTRACT OF THE DISCLOSURE

In the combination of a tractor and a soil-working implement for the disturbance of soil in the harvesting of root crops, the soil-working members of the implement comprise a pair of soil-working interactive disc-like rotors, at least one of which is driven. The soil-working implement is secured to and supported on the tractor so as to place the soil-working position of the disc-like rotors laterally outwardly relative to the laterally outermost ground engaging driving wheels of the overall combination of tractor and implement. Side drag is avoided by virtue of the driven soil-working rotor. The attachment of the implement to the tractor includes an arrangement whereby the frame of the implement can be pivoted upwardly or downwardly to vary the working depth of the disc-like rotors in the soil.

---

This application is a continuation of application Ser. No. 337,892, filed Jan. 15, 1964, now abandoned.

This invention relates to agricultural and like machines for use, for example, in the harvesting of crops, such as potatoes, bulbs and similar tubers which grow below ground level, in addition to true root crops, or crops whose main harvestable portions are above ground level.

The invention provides the combination of a tractor and a soil-working implement for the disturbance of soil in the harvesting of root crops, comprising a tractor having a driving motor, at least two power driven soil engaging driving wheels driven by the motor and defining the lateral limits of the power driven wheels of the overall combination of tractor and implement, a pair of soil-working interactive disc-like rotors constituting the working members of the implement, mounting means for supporting these rotors so as to have the general planes of the rotors converge downwardly, drive train means for one of the rotors, attachment means for securing the implement to the tractor to place the soil-engaging position of the rotors outside the lateral limits of the power driven wheels of the combination, and coupling means by which the drive train means is connected to a power output from the driving motor to rotate the associated rotor at a desired speed and in a direction such that the lowermost edge of the rotor moves in the direction opposite to the normal direction of travel of the tractor. Preferably the drive train means includes replaceable members so as to permit varying of the speed of rotation of the associated rotor, and an adjustable frame carries the mounting means so as to permit bodily movement of the rotors to vary their working depth in the soil.

If a machine in accordance with the invention is used for lifting, say, carrots, the rotors will be positioned so that their lower parts enter the ridge soil alongside and beneath the root and the rotation of the rotors as the machine moves forward will loosen the soil, and tend to raise the carrots to an extent depending upon the setting of the rotors. The carrots may then be collected by hand or, alternatively, elevating means may be provided, also mounted on the machine, possibly on said attachment.

The mouth of such elevating means may be arranged also to be alongside the machine so as to be adapted to receive the crop and to dispose of it suitably, for instance into means for storing the crop temporarily on the machine.

Engagement with the soil by an ordinary share, side mounted, would normally result in share drag, or side draught, which produces a couple tending to rotate the machine about the share. In a machine embodying the present invention, however, the speed of rotation of the rotors may be adjusted so that side draught may be considerably reduced or eliminated. Indeed, under certain conditions it may be advantageous to make the speed of rotation such as to produce a forward component of force acting on the machine.

A machine in accordance with the invention therefore, can be highly maneuverable and easy to control, even though the rotors are side-mounted and engage the soil. Such side-mounting itself has advantages, the main one probably being that, when harvesting, the vehicle may be kept outside the growing crop; another advantage is that the rotors and the mouth of elevating means, if provided, can be sited within view of the driver.

An indirect advantage, but one that is very cogent, resides in the fact that, with side-mounting, it is possibly for larger gear to be carried entirely by the machine, since the gear may be mounted in such a way as to be balanced fore and aft, about the driving axle. This latter facility also enables the total length of the machine to be considerably less than that in the case of the more usual, rear-mounted or towed gear for performing the same function; and, because of the possibility of heavier loads on the axle, occasioned by this facility, enhanced tractive effort may be obtained in bad conditions.

Where no elevating means is provided on the machine, it is possible for the rotors to be used simply to lossen the soil around certain crops so that these crops, and carrots and the like come in mind in this category, may be gathered by hand where, for example, manual labour is plentiful.

In order that the invention may be better understood, one embodiment thereof, comprising a pair of rotors, will now be described with reference to the accompanying drawing, of which FIGURE 1 shows a plan view of an attachment for a tractor and FIGURES 2 and 3, side and front views respectively.

As shown in the drawing, the attachment comprises a box girder type main support member 1 which has two pivots 2 and 3 for connection to standard linkage points on a tractor frame and is provided with a lever system 4 having a pivot for attachment to a link 5, which may include an hydraulic cylinder and by means of which the support member may be rocked about the pivots 2 and 3. The support member houses sprocket wheels such as indicated at 6, 7 and 8, for a chain drive 9 and 10 connecting a drive shaft 11, which is driven from the power take-off of the tractor, with shafts 12 and 13 for driving rotor discs 14 and 15 respectively, and with the shaft 16 for driving an elevating conveyor 17.

An outline of a tractor is included in FIGURES 1 and 2 and it will be observed that both the active parts of the rotors 14 and 15 and the mouth of the conveyor 17 are within the view of a driver sitting at the wheel of the tractor. Then, the rotors having been lowered to the position indicated in this particular setting, by means of the link 5, the driver will be able to observe lifting of the crops from the ground into the mouth of the conveyor. For in-soil working by suitable choice of the sprocket gear 6, 7 and worm and wheel drive 18 for the discs, the speed of rotation of the rotors may be adjusted so that the movement of the rotors at their closest peripheral parts may be set in relation to the forward motion of the tractor, for instance, in order that side draught may be eliminated;

the result of all these features is that the driver has remarkably good control over the machine and the harvesting operation. Control of depth of penetration of the rotors into the ground, or height above the ground, may be readily achieved by means of the link 5. In this particular embodiment, the supports 19 and 20, housing driving shafts 12 and 13 for the discs, are arranged for angular adjustment as well as spacing adjustment, by means of bolted connections; but it is evident that, alternatively, some form of continuous adjustment may be provided, which may be under the control of the driver if desired.

The point which has been made above regarding the compactness of the whole machine will be evident from inspection of the drawing; if desired, also, the support member 1 may be provided with a ledge 21, indicated in dotted outline, for receivers 22 into which the crop may be lifted by the elevator. Retention of the load on the machine may be useful in resulting in additional tractive effort, as referred to above.

We claim:

1. The combination of a tractor and a soil-working implement for the disturbance of soil in the harvesting of root crops, comprising: a tractor having a driving motor and at least two spaced power driven, soil-engaging driving wheels driven by the motor; a soil-working implement, said implement comprising a frame, a pair of soil-working interactive disc-like rotors constituting the working members of the implement, mounting means supporting said disc-like rotors on said implement frame so as to have their general planes converge downwardly, and drive train means for one of said disc-like rotors; attachment means for securing said implement frame to and supporting said implement frame from said tractor so as to place the soil-working position of said disc-like rotors laterally outwardly relative to the laterally outermost ground engaging driving wheels of the overall combination of tractor and soil-working implement, whereby the side drag effect caused by the soil working of said rotors laterally outwardly of any driving wheel is compensated by driving one of said soil-working rotors; and coupling means by which the said drive means for one of said rotors is connected to a power output from the driving motor to rotate the one of said rotors at a desired speed and in a direction such that the lowermost edge of the rotor moves in the direction opposite to the normal direction of travel of the tractor, thus compensating for said side drag effect.

2. The combination according to claim 1, in which the drive train means includes replaceable members so as to permit varying of the speed of rotation of the associated rotor.

3. The combination according to claim 1 wherein said implement frame is secured adjustably to said tractor by said attachment means, and further comprising means for adjusting said implement frame so as to move said soil-working rotors upwardly and downwardly to selectively vary their working depth in the soil.

References Cited

UNITED STATES PATENTS

| 2,791,076 | 5/1957 | Richardson | 171—61 X |
| 2,791,083 | 5/1957 | Richardson | 171—61 X |
| 3,144,910 | 8/1964 | Hawkins et al. | 171—58 |

ABRAHAM G. STONE, *Primary Examiner.*

ANTONIO F. GUIDA, *Examiner.*